Oct. 22, 1968

A. E. SCOTTI

3,406,576

INDEXING GYRO BEARING FRICTION MINIMIZING MEANS

Filed March 3, 1966

INVENTOR.
ANTHONY E. SCOTTI
BY
Constantine A. Michalos
ATTORNEY

Oct. 22, 1968  A. E. SCOTTI  3,406,576
INDEXING GYRO BEARING FRICTION MINIMIZING MEANS
Filed March 3, 1966  5 Sheets-Sheet 2

INVENTOR.
ANTHONY E. SCOTTI
BY
Constantine A. Michalos
ATTORNEY

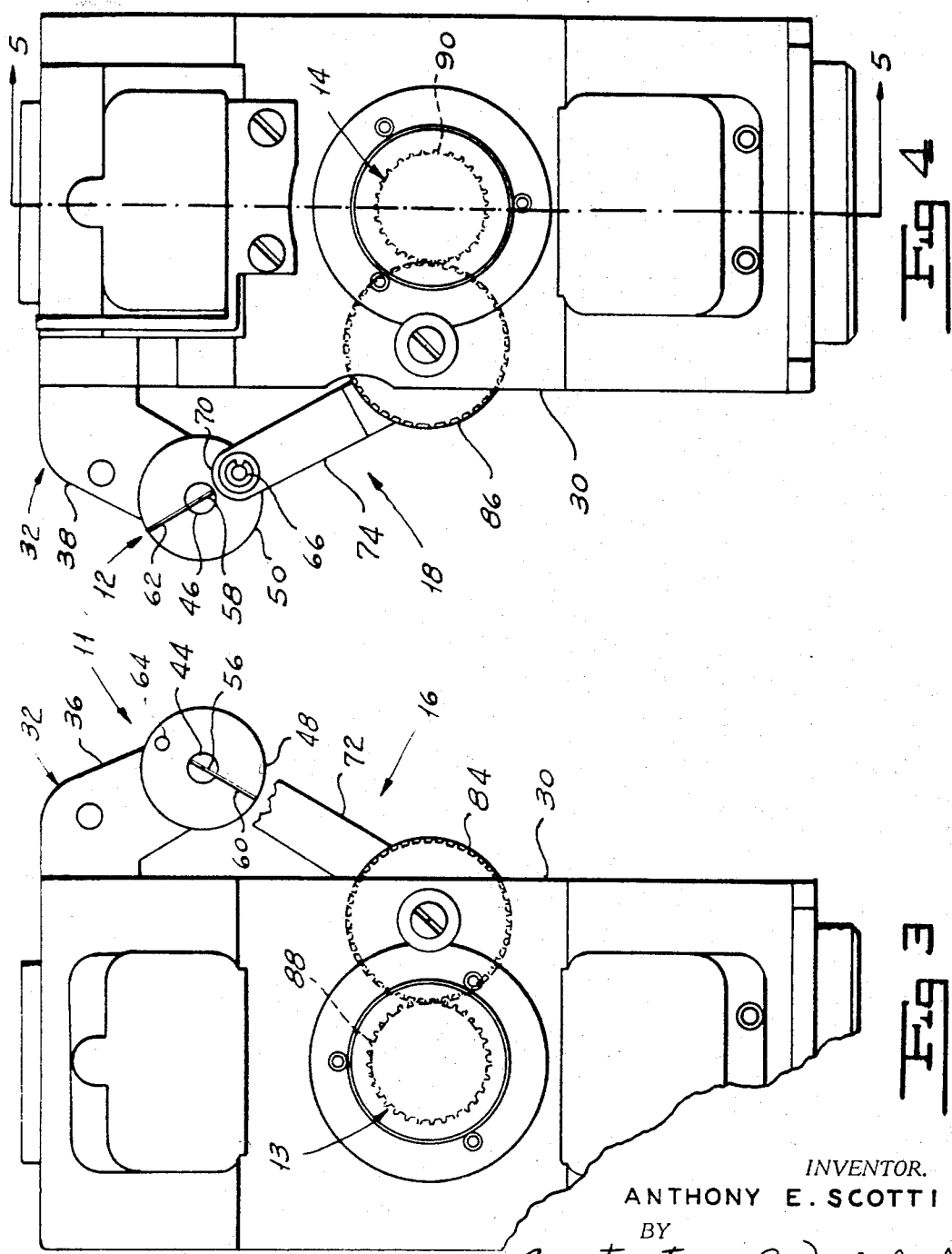

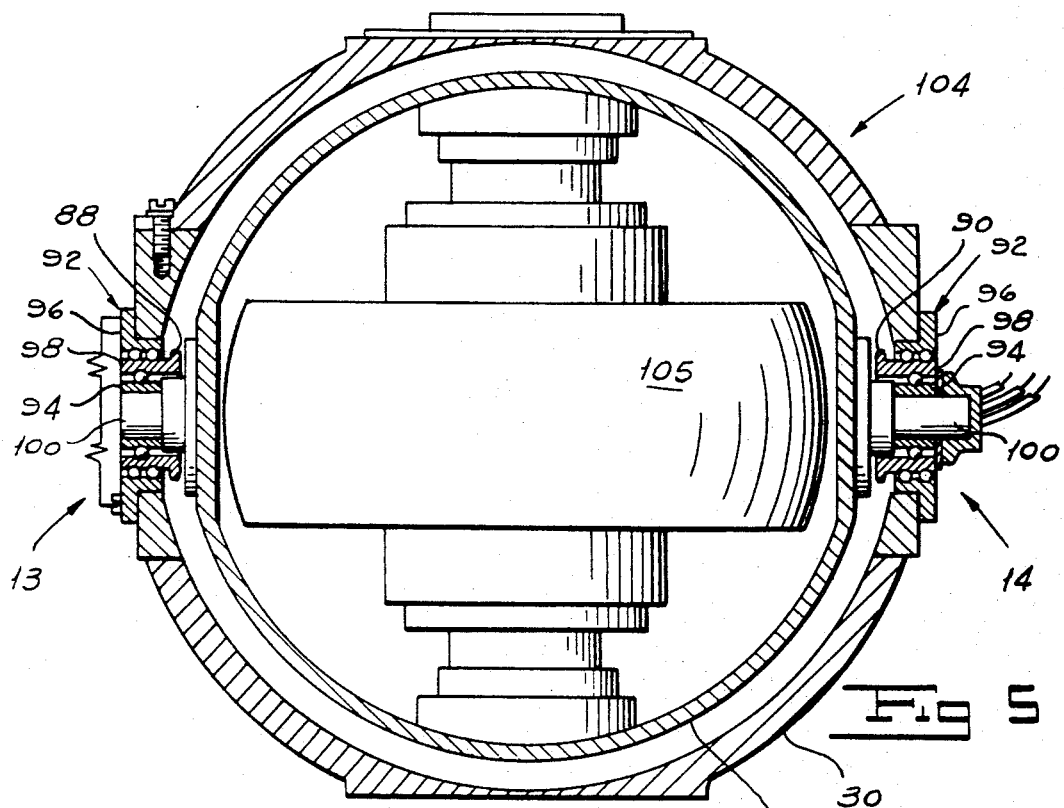
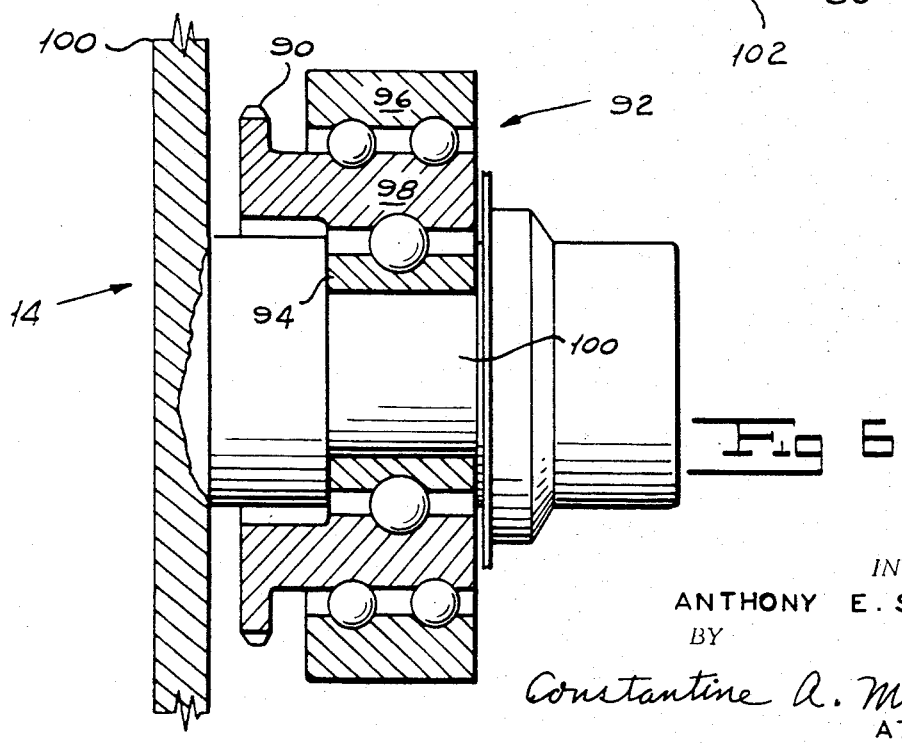

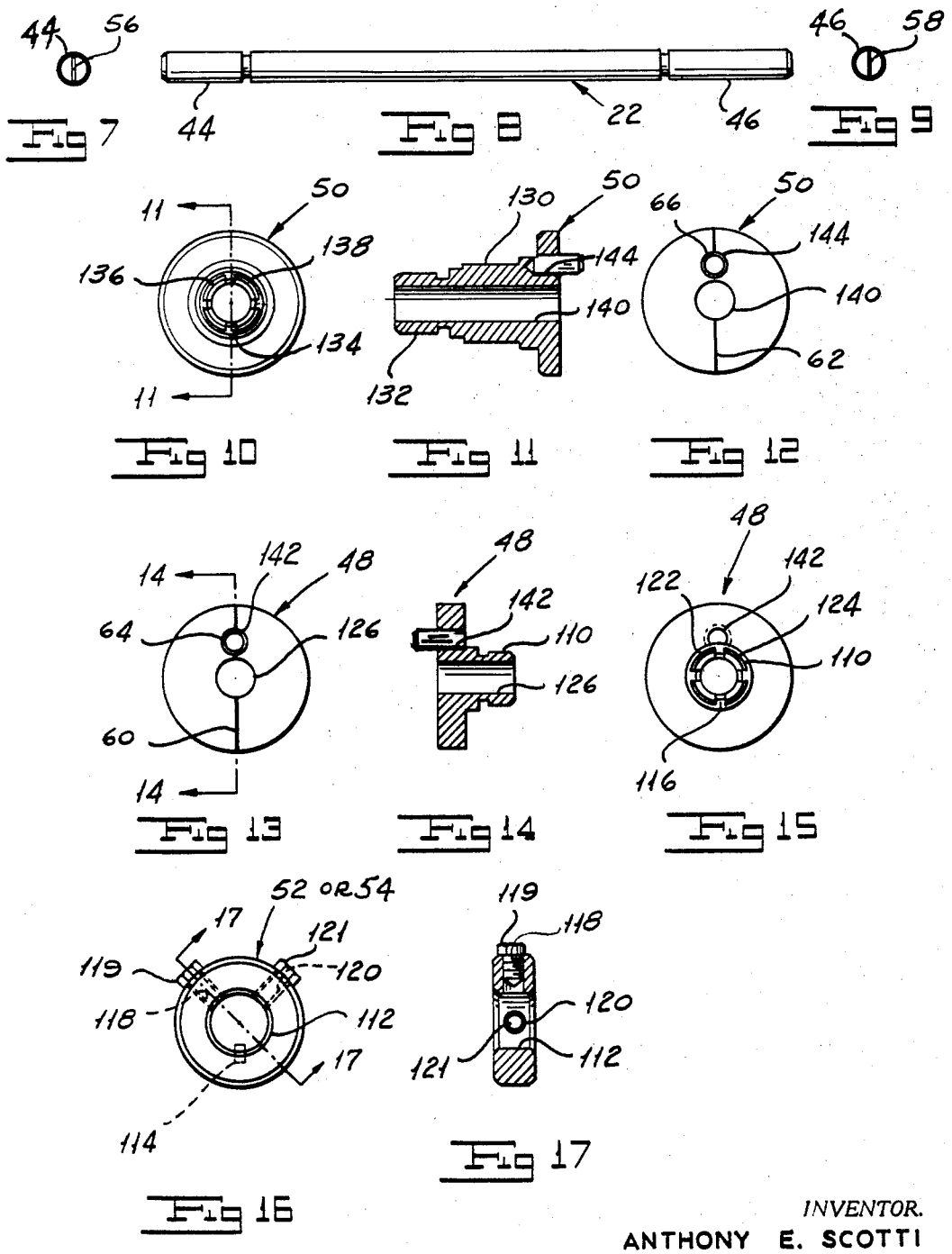

United States Patent Office 3,406,576
Patented Oct. 22, 1968

3,406,576
INDEXING GYRO BEARING FRICTION MINIMIZING MEANS
Anthony E. Scotti, Pompton Lakes, N.J., assignor to The Bendix Corporation, a corporation of Delaware
Filed Mar. 3, 1966, Ser. No. 531,557
10 Claims. (Cl. 74—5.5)

ABSTRACT OF THE DISCLOSURE

In a gyro bearing friction minimizing means, an indexing means for precisely setting a rotatable actuating means in relation to an oscillating mechanism for counter actuation of intermediate races of opposed bearings supporting a gyro gimbal so as to provide for an exact same travel and an exact same time of actuation in both directions of the intermediate races of the opposed bearings.

---

This invention relates generally to gyro bearing friction minimizing means and more particularly to a means for indexing an oscillating mechanism used in counter actuating the intermediate races of a pair of opposed gyro supporting dual bearings, wherein the intermediate race of each bearing is oscillated equally through a displacement of less than 180 degrees while being maintained precisely at 180 degrees out of phase with each other.

The problem of friction on the sensitive or horizontal gimbal axis of a directional gyro or on the output axis of a single degree of freedom gyro has long been a limitation upon minimizing the gyro drift. In addition, as is well known in the art, the starting or breakaway torque of a gimbal bearing of a gyroscope is the restraining torque that must be overcome to start rotation of a bearing. The value of this breakaway torque is somewhere between the actual running torque and twice the running torque for a bearing. This is the torque that contributes greatly to the drift of a normal directional gyroscope. If a condition exists which causes a torque to be put into a system which is supposed to correct the torque, the original system does not function as it was designed to do. Therefore a method and means to minimize this torque is highly desirable.

Heretofore, among the approaches for solving these problems have been to eliminate or reduce the friction by floating the gyroscopic element in a gas or liquid or by the concept of cancelling the friction torques. Many variations of putting one bearing inside of another have been tried. One type of bearing presently being marketed accomplishes this, interface of the two bearings, by means of an intermediate race. The improvement in performance by such a device is, to a large extent, dependent upon what is done with the intermediate race.

In some cases this intermediate race has been vibrated or dithered. In some cases the intermediate races of the two bearings, comprising a gimbal trunnion, have been alternately rotated in opposite directions. That is, for a certain period of time and for a number of revolutions, the intermediate race was rotated in one direction and then periodically this rotation of one intermediate race has been reversed.

Under any condition, the attempt is to reduce the friction by converting any static friction to a condition of rolling or kinetic friction. In this manner the torque on the given gimbal axis introduced by the rolling friction of one bearing will be counteracted by the torque introduced by the rolling friction of the other bearing.

A means for oscillating a bearing gyro system is described and claimed in a copending U.S. application Ser. No. 531,390 filed Mar. 3, 1966, by Charles E. Hurlburt, and assigned to The Bendix Corporation, the same assignee of the present invention.

An object of the present invention is to provide in the means for oscillating a bearing gyro system a precisional means of adjustment of a pair of opposed gyro supporting dual bearings whereby the rotation of the intermediate race of each of the dual bearings may be set for a degree to a degree of oscillation. That is, there is provided an exact means wherein, without loss of time and energy, an exact oscillation of the intermediate race of each dual bearing in both time and distance may be effected.

Therefore an object of this invention is to provide indexing means for setting the frictional minimizing means for use in the cancellation of friction within the bearings so as to produce oscillation of the intermediate race in each dual bearing with exactly the same time of actuation in one direction as in the other direction and with the intermediate race in each of the pairs of bearings having exactly the same travel or displacement in opposite directions.

Another object of this invention is to provide indexing means for precisely setting a device used for angularly oscillating the intermediate races of a pair of dual bearings, the oscillation being equal in time and rate in opposite directions of the intermediate race of one bearing in relation to the other bearing for perfect cancellation of frictional torques within the bearings.

A further object of this invention is to provide indexing means for precisely setting a device used in cancelling the frictional torque within a pair of opposed dual bearings by providing precision adjusting means for setting the device to cause the intermediate races of a pair of dual race bearings to oscillate through a rotational distance which is less than 180 degrees.

Still a further object of this invention is to provide an indexing means or marks on the common axis of a rotating means which is used for aligning a linkage assembly connected to an oscillating mechanism for oscillating the intermediate races of a pair of opposed dual race bearings supporting a gyro wherein the intermediate race of each opposed bearing is precisely set by said indexing means for oscillating less than 180 degrees while being maintained precisely at 180 degrees out of phase of each other.

An additional object of this invention is to provide an indexing means for setting a driving device used in the process of exact cancellation of friction of a dual bearing by so setting the driving device by said indexing means for effecting exact equal displacement with exact equal time of the oscillation of the intermediate race of the dual bearing rather than by having multiple revolutions reversed at equal intervals of either time or displacement but not necessarily of both.

These and other objects and features of the invention are pointed out in the following description in the terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 3 is an end view of a gyro casing, embodying the friction minimizing means shown in FIGURE 2, and illustrating the novel indexing means of the present invention;

FIGURE 4 is an opposite end view of the gyro casing of FIGURE 3 embodying the friction minimizing means shown in FIGURE 2 and illustrating the novel indexing means of the present invention;

FIGURE 5 is a sectional view of the device shown in FIGURE 2 taken substantially along line 5—5 of FIGURE 4;

FIGURE 6 is an enlarged detailed sectional view of a fragmentary portion of one of the pairs of dual oscillating bearings embodied in the device shown in FIGURE 5;

FIGURE 7 is an end view of the jack shaft 22 of the friction minimizing means and showing an indexing scribe mark utilized for the alignment operation of the friction minimizing means;

FIGURE 8 is a side view of the jack shaft;

FIGURE 9 is an opposite end view of the jack shaft shown in FIGURES 7 and 8 and showing a second indexing scribe mark which is utilized for the alignment operation of the friction minimizing means;

FIGURE 10 is an end view of a pivot wheel 50 of the friction minimizing means of FIGURE 2;

FIGURE 11 is a sectional view taken substantially along line 11—11 of the pivot wheel of FIGURE 10;

FIGURE 12 is an opposite end view of the pivot wheel of FIGURES 10 and 11 showing a scribe indexing mark utilized in the aligning with the indexing mark of FIGURE 9 as shown by FIGURE 4;

FIGURE 13 is an end view of a second pivot wheel 48 of the friction minimizing means of FIGURE 2 and showing an indexing mark utilized in the alignment with the indexing mark of FIGURE 7 at the other end of the element shown in FIGURE 8 as shown by FIGURE 3;

FIGURE 14 is a sectional view taken substantially along line 14—14 of the pivot wheel of FIGURE 13;

FIGURE 15 is an opposite end view of the pivot wheel of FIGURES 13 and 14;

Figure 2:
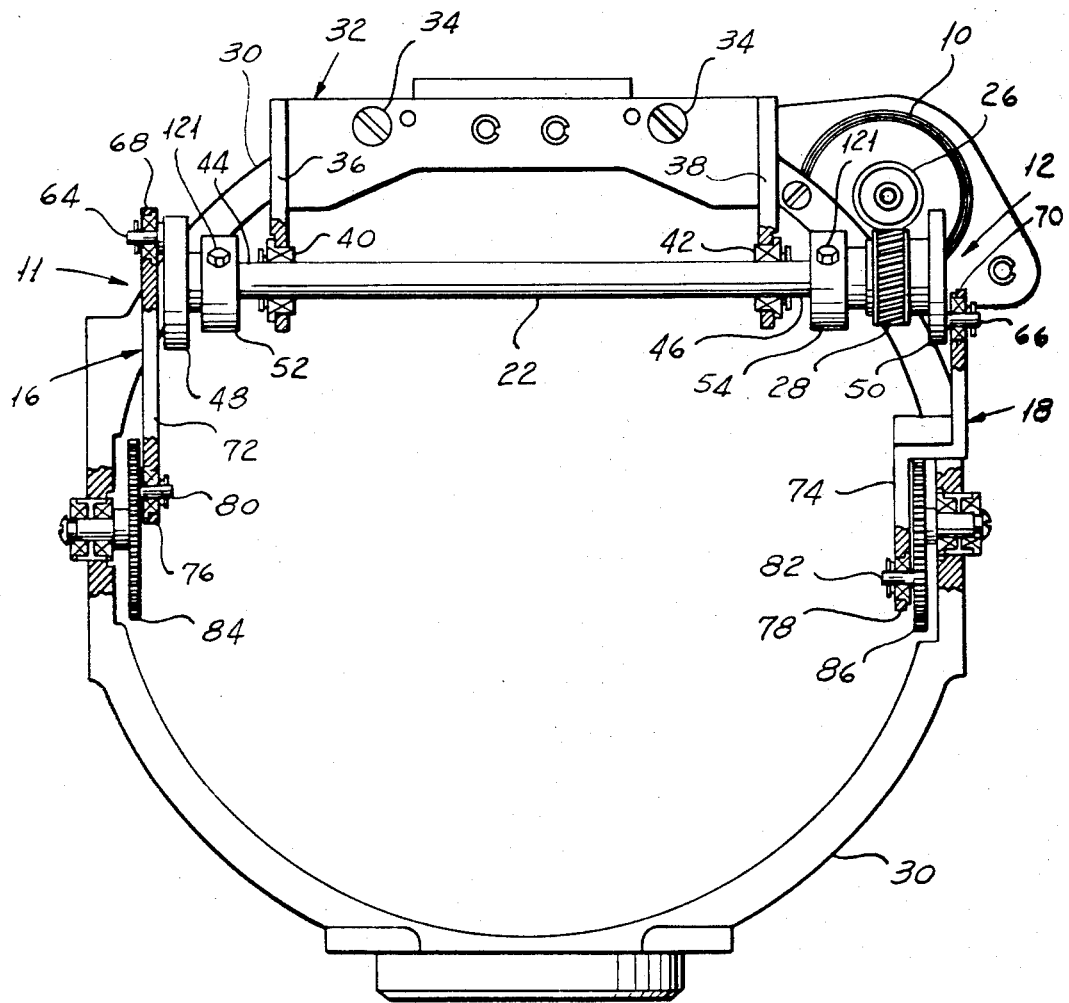
FIGURE 2 is a detailed front view, partially in section, of the friction minimizing means shown in FIGURE 1.

FIGURE 16 is an end view of an adjustable clamp which may be utilized to coaxially secure the pivot wheels of FIGURES 10 and 15 to the jack shaft 22 of the bearing friction minimizing means shown in FIGURE 2; and, FIGURE 17 is a sectional view taken along line 17—17 of the adjustable clamp of FIGURE 16.

Figure 1:
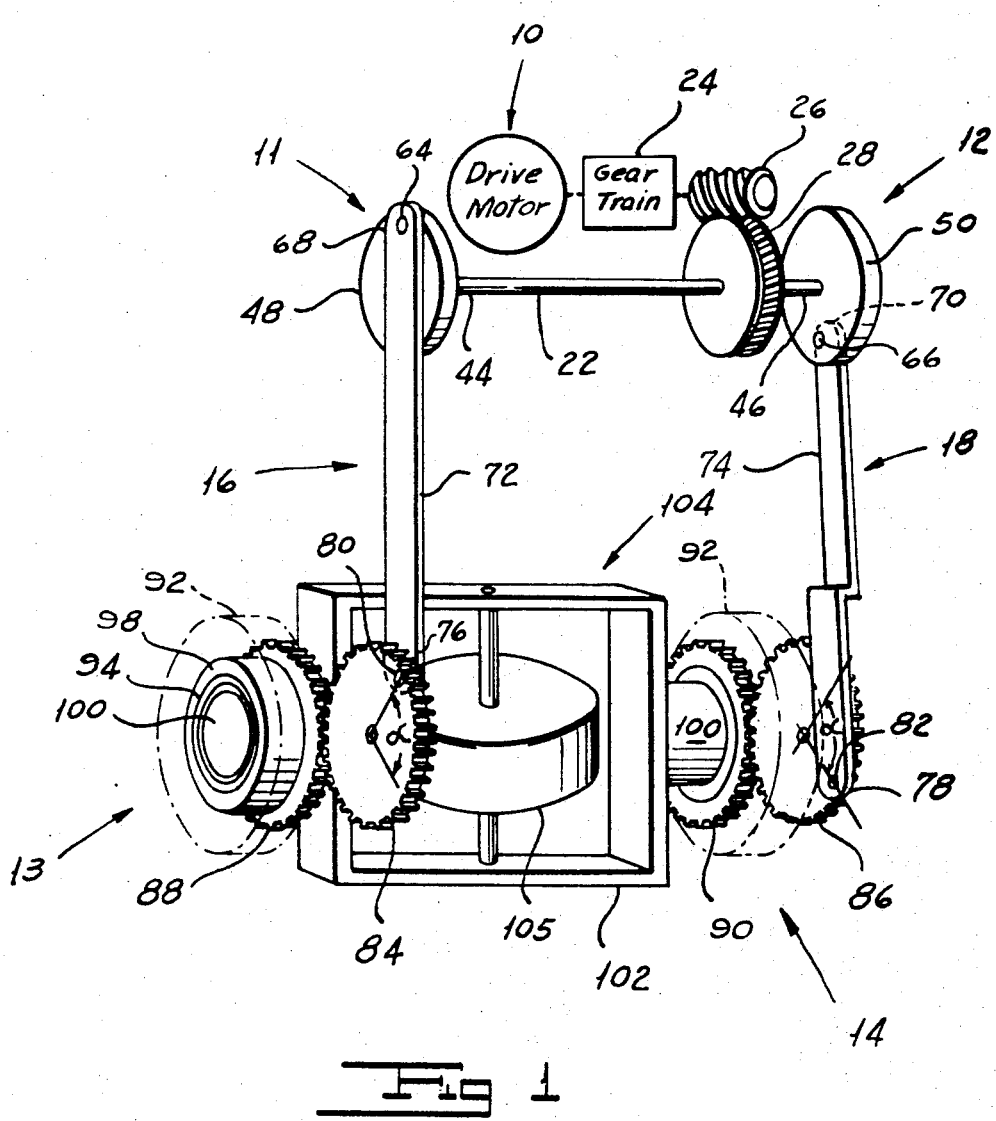
FIGURE 1 is an elevational schematic view showing a gyro bearing friction minimizing means to which the novel indexing means of the present invention may be applied.

Referring to the drawing of FIGURE 1 in detail, the novel indexing means of the present invention may be applied to a novel friction minimizing means described and claimed in a copending U.S. application Ser. No. 531,390 filed Mar. 3, 1966 by Charles E. Hurlburt, and assigned to The Bendix Corporation, assignee of the present invention. Such novel friction minimizing means is not the subject matter of the present invention and no claim is made thereto herein. The novel frictional minimizing means includes a motor 10 driving, in one direction or rotation, a pair of actuating means 11 and 12 which in turn oscillate a pair of journaled mechanism means 13 and 14 through a pair of driving arm assemblies or linkage assemblies 16 and 18 respectively.

In such arrangement, the motor 10 drives a jack shaft 22, shown in detail in FIGURES 1, 2, 7 to 9, through a gear reduction train 24 which in turn is connected to a worm gear 26 which meshes with a pinion gear 28, and which is coaxially attached to the jack shaft 22.

As best shown in FIGURE 2, the motor 10 is supported on a gimbal frame 30. The gimbal frame 30 also supports the jack shaft 22 through a bracket 32 secured to the frame 30 through screws 34. The bracket 32 comprises a pair of arms 36 and 38 having bearings 40 and 42 in which the shaft 22 is mounted and which permits rotation of said shaft when driven by the motor 10.

The shaft 22 supports, at each end portion 44 and 46, the actuating means 11 and 12 as shown by FIGURES 2, 3 and 4. The actuating means 11 and 12 include offset pivot wheels 48 and 50, shown in detail in FIGURES 13 to 15 and 10 to 12, respectively, which are coaxially secured to the shaft 22 by means of a pair of adjustable clamp collars 52 and 54, one of which is shown in detail in FIGURES 16 and 17.

The adjustable clamp collars 52 and 54 also provide means for calibrating, adjusting, or lining up indexing marks 56 and 58 inscribed on the ends 44 and 46 of the jack shaft 22, as best shown in FIGURES 3 and 4 and FIGURES 7 and 9, with indexing marks 60 and 62 inscribed on the face of the pivot wheels 48 and 50 as shown by FIGURES 3 and 4 and FIGURES 13 and 12 and which provide a novel indexing means for facilitating the determination of the relative phase between the two linkage assemblies 16 and 18 and which novel indexing means forms the subject matter of the present invention as described and claimed herein.

The offset pivot wheels 48 and 50 include pivot pins 64 and 66 which can be adjusted to be exactly 180 degrees out of phase with each other, as can be best seen in FIGURES 1, 3 and 4. At the end portions 44 and 46 of the shaft 22, the pivot pins 64 and 66 which are integral to wheels 48 and 50, respectively, pivotally support, at ends 68 and 70, linkage arms 72 and 74 of the linkage assemblies 16 and 18 respectively. Connecting the linkage arms 72 and 74 at their other ends 76 and 78 is a pair of pins 80 and 82 of oscillating pivot wheels or gears 84 and 86, respectively.

The pivot pins 80 and 82 are located on the pivot gears 84 and 86 so that the pivot pins 80 and 82 can travel at exactly equal angles α for 180 degrees of rotation of wheels 48 and 50 which are so arranged as to oscillate an angle α which is less than 180 degrees, as shown by FIGURE 1.

Thus, when pin 64 of the continuous rotating offset pivot wheel 48 is at the end of a cycle of operation of 360 degrees of rotation, the pin 66 of the continuous oscillating pivot wheel 50 will be 180 degrees of rotation out of phase with the pin 64 which will be at the middle of its cycle of operation of 360 degrees of rotation. Since pivot gears 84 and 86 are connected by the linkage arms 72 and 74 through the wheels 48 and 50, the pin 80 of the oscillating gear 84 will be at the end of its cycle of operation of 2α degrees of oscillation, while the pin 82 of the oscillating gear 86 will be α degrees of oscillation out of phase with the pin 80. Thus the pin 82 will be at the middle of its cycle of operation and α degrees from the pin 80.

Each of the pivot gears 84 and 86 are connected to the oscillating journaled mechanisms 13 and 14 by a gear 88 meshing with the pivot gear 84 and by a gear 90 meshing with the pivot gear 86, respectively.

As shown in more detail in FIGURE 6, each journaled mechanism includes a bearing 92 having an inner race 94, an outer race 96, and an intermediate race 98. Each gear 88 and 90 is connected to one intermediate race such as intermediate race 98 of each bearing which forms the horizontal trunnion on an output axis of an inner gimbal shaft 100, shown in FIGURES 1 and 5, of an inner gimbal 102 of a single degree of freedom gyro 104 having a gyro rotor 105 rotatably mounted in the gimbal 102 and rotatably driven therein by suitable motor means of conventional type.

Thus, the jack shaft 22 serves to drive through gears 84 and 86, the gears 88 and 90 and thereby the intermediate races 98 of the bearings 92 for the inner gimbal shaft 100. That is, the mechanical system just described oscillates the intermediate races 98 which are connected to the gears 88 and 90 so as to provide an equal angle of oscillation thereof of less than 180 degrees. The bearing oscillating action comes to a complete stop and then reverses the direction of oscillation of the bearings at both sides of the axis of the shaft 100 and at precisely the same time so as to cancel the starting torque at both sides of the shaft 100 at the same moment.

The linkages 72 and 74 are so connected that while the pins 64 and 66 rotate continuously in one direction, the pivot pins 80 and 82 are so arranged as to cause the intermediate race 98 of each bearing to oscillate opposite in the phase to each other through equal angles of not more than 180 degrees. The ratio of the gears 84 and 88 and gears 86 and 90 are so selected that the angle of oscillation of the intermediate race 98 will be between a critical range of less than 180 degrees and more than 90 degrees or an optimum range of, for example, 107 degrees. Further, to effect the foregoing, the radius of rotation of the pins 80 and 82 is arranged so as to be greater than the radius of rotation of the pins 64 and 66 so that the intermediate race 98 may be oscillated through the aforenoted critical angle range by the hereinbefore mentioned mechanism.

It has been found that the optimum angle of oscillation of the intermediate race 98 is 107 degrees. If the angle of oscillation of the intermediate race 98 approaches the angle of 180 degrees, a "hang-up" type of operation would tend to result. That is, the intermediate race 98 driven through the linkages would be at a point where it would be indetermined as to which direction it would oscillate. On the other hand, if the angle of oscillation of the race 98 is reduced below an angle of 90 degrees, there would be sharp reversal of the oscillation which would tend to add undesirable shock forces to the system.

In this manner when the intermediate race of one bearing introduces some small rolling friction into the gimbal axis in one direction, the intermediate race of the opposite bearing introduces an equal and completely opposite rolling friction into the gimbal axis in the other direction to thereby cancel the friction introduced by the first bearing. By this method it is assured that exact cancellation of the friction can be achieved by exact equal displacement and by exact equal timing which is more effectively obtained than by having a multiple revolution of the intermediate race of the bearing.

*Novel indexing means*

Referring to FIGURES 7 to 17, the present invention is directed to the provision of a novel indexing means including the inscribed indexing marks 56 and 58 on the common axis of rotation of the jack shaft 22 to be aligned with the indexing marks 60 and 62 inscribed on the face of the pivot wheels 48 and 50.

In this invention the mechanical elements such as the shaft 22, pivot wheels 48 and 50, gears 84 and 86 and gears 88 and 90 will be aligned by aligning the indexing marks 60 and 62 on the wheels 48 and 50 respectively to match the lines 56 and 58 on the shaft 22 so that the angle of rotation of the bearings 88 and 90 can be set equal and opposite at any angle. In this invention these lines are set at exactly 180 degrees out of phase with each other.

As brought out before this bearing oscillation action comes to a complete stop and reverses to reverse direction of oscillation of the bearings 92 at both sides of the axis of the shaft 100 at precisely the same moment so as to cancel the starting torques within the bearings 92 at both sides of the shaft 100 at the same time. Now if the shaft 22 is so indexed in relation to the oscillating mechanism that this reversing operation cancels each at the same moment, the starting torque is minimized to a degree depending on the accuracy of the indexing of the shaft 22. The one bearing being oscillated in one direction, such as in a clockwise direction, and the other bearing being oscillated at the same time in a counterclockwise direction to cause this effect.

In this arrangement the shaft 22 has the indexing marks 56 and 58 at opposite ends and through the center of the shaft 22 exactly on a zero degree to 180 degrees line while the rotating wheels 48 and 50 have indexing marks 60 and 62 running through the centers for alignment with the indexing marks 56 and 58 on the opposite ends of the shaft 22 exactly on a zero degree to 180 degrees line reverse bicyclic effect will be equal and opposite at the precise moment of change or rotation causing a nulling in the starting torque of the bearing 92.

In assembling the actuating elements of the invention, a serrated end 110 of the pivot wheel 48 is threaded through a hole 112 of the collar 52 with a key portion 114 directed through one key slot such as 116 of the wheel 48. Located on the adjustable clamp collars 52 and 54 are radially extending threaded holes 118 and 120 for screw threadedly receiving therethrough lock bolts 119 and 121, respectively, for contacting two segments such as segments 122 and 124 of the serrated end 110 of the wheel 48.

The shaft 22 then is threaded by one end portion 44 through the hole 126 of the pivot wheel 48. The bolts 119 and 121 can then be screwed within threaded holes 118 and 120 of the collar 50 to force the segments 122 and 124 of the wheel 48 against end portion 44 of the shaft 22 to lock the wheel 48 in place after aligning the inscribed mark 60 of the wheel 48 with the inscribed mark 56 of the shaft 22.

The pivot wheel 50 has a surface 130 on which may be secured the gear 28. In the same manner, serrated end 132 of the pivot wheel 50 is threaded through a hole such as hole 112 of the collar 54 with a key portion such as key portion 114 directed through one key slot such as key slot 134 of the wheel 50. The pivot wheel 50 is provided with serrated segments such as segments 136 and 138 and the shaft 22 has its end portion 46 threaded through the hole 140 of the pivot wheel 50 so that lock bolts 119 and 121 can be screwed within the threaded holes such as holes 118 and 120 to force the segments 136 and 138 against the end portion 46 of the shaft 22 to lock the wheel 50 in place. This procedure is followed after aligning the inscribed mark 62 of the wheel 50 with the inscribed mark 58 of the shaft 22.

It should be noted that the wheel 48 has a threaded hole 142 which has a center line exactly in line with the scribe mark 60 for receiving the pivot pin 64 and the wheel 50 has a threaded hole 144 which has a center line exactly in line with the scribe mark 62 for receiving the pivot pin 66.

Therefore in making the adjustment of the wheels 48 and 50 to effect the indexing of the marks 60 and 62 thereon in relation to the marks 56 and 58 on the shaft 22, it may be noted that the wheels 48 and 50 are releasably attached to the shaft 22 by the adjustable clamp collars 52 and 54. The fastening means may be released by the bolts 119 and 121 threaded through the holes 118 and 120 of collars 52 and 54 so that the wheels 48 and 50 may be rotated independently of the shaft 22 to adjust the arms or linkages 72 and 74 in relation to the shaft 22 and thereby line up the scribe mark 60 on the wheel 48 with the scribe mark 56 of the shaft 22 and the scribe mark 62 on the wheel 50 with the scribe mark 58 on the shaft 22 at the desired precise adjusted indexed position.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyro bearing friction minimizing means in combination with a gyroscope having opposed bearings supporting a gyro gimbal, each of said bearings including an intermediate race, oscillating journaled mechanism means connecting each intermediate race of each opposed bearing, rotatable actuating means continuously rotating in one direction, means connecting said rotatable actuating means to each of said journaled mechanism means, said connecting means for continuously acting upon said journaled mechanism means so as to produce a reverse bicyclic effect for oscillating each of said intermediate races in opposite directions to each other, said journaled mechanism means thereby oscillating each of the intermediate races at an equal displacement over an angular range of less than 180 degrees and at an equal period of oscillation, thereby converting the static friction of said bearings to kinetic friction and thus limiting the friction within said bearings equally in both directions, the improvement comprising indexing means including adjustable means operatively effective for precisely setting said rotatable actuating means in relation to said journaled mechanism means to provide for an exact same travel and an exact same time of actuation of each of said intermediate races in said opposite directions to each other.

2. The combination defined by claim 1 including linkage assembly means interposed between said oscillating journaled mechanism means and said rotatable actuating means, said actuating means including first pivotal connecting means for connecting said linkage assembly means at a predetermined offset distance from the center of rotation of said rotatable actuating means, and said oscillating journaled mechanism means including second pivotal connecting means connecting said linkage assembly means at an offset distance from the center of oscillation of said oscillating journaled mechanism means which is greater than the predetermined offset distance of said first connecting means, and said indexing means including locking means operatively effective after precisely setting said actuating means in relation to said journaled mechanism means, said locking means being adjustably arranged for securing said rotatable actuating means in relation to said oscillating journaled mechanism means for producing the continuous oscillating motion at an exact and equal displacement and at an equal period of oscillation as said actuating means is continuously rotated in one direction for cancelling out the torque produced by oscillation in one direction by the oscillation in the other direction.

3. The combination defined by claim 1 further comprising means for driving said actuating means in one direction of rotation, said driving means including a motor, a worm and gear drive means operably driven by said motor, and a jack shaft driven by said worm and gear drive means, said shaft including an end face at each end portion, said indexing means including said jack shaft having a first scribe mark extending on the face of each end face of each end portion across a center axis of said shaft, said rotatable actuating means including a pivot wheel at each end portion of said shaft and coaxial to said shaft, said pivot wheel continuously rotated in one direction by said motor through said shaft, each of said wheels including a face extending transverse to the axis of rotation of said shaft and having a second scribe mark in line with a line extending across its axis for providing means for indexing each of said wheels with said shaft by alignment of the first scribe mark of each of the end faces of said shaft with the second scribe mark on each of the faces of said wheels, and an offset pivot pin located at a predetermined radius of each of said pivot wheels and having an axis located on said second scribe mark, adjustable fastening means operable for releasably securing each of said wheels with said shaft to effect indexing of the marks on said shaft in relation to said wheel for providing thereby an equal oscillation in the one direction in distance and time with the other direction and for securing each of said pivot wheels and for pivotally supporting each of said linkage assembly means in continuously oscillating said oscillating journaled mechanism means.

4. The combination defined by claim 1 further comprising a motor, a worm and gear drive, a jack shaft driven continuously in one direction by said motor through said worm and gear drive, said indexing means including said jack shaft having a first scribe mark extending across each face of each of its end portions on a common axis of rotation of said shaft, said motor operably rotating, through said shaft, each of said actuating means, each of said actuating means including an offset pivot wheel driven by said jack shaft in continuous rotation in one direction, said wheel including a second scribe mark in line with said first scribe mark extending across an axis of said wheel and the common axis of rotation of said shaft, the first and second scribe marks providing means for alignment of said wheel with said shaft, an offset pin connected to said pivot wheel centrally on the second scribe mark of each of said wheels at a predetermined radius from a center of rotation of said wheel, adjustable fastening means operable for releasably securing said wheel on said shaft to effect indexing of said shaft in relation to said wheel by alignment of the first and second scribe marks for providing thereby an oscillation in the one direction equal in distance and time with the other direction, a link connected at one end to said pin, a second offset pivot wheel, a second offset pin connecting said link at its other end, said second offset pivot wheel connecting said oscillating journaled mechanism for operably oscillating the intermediate race of each of said bearing at an exact same time of actuation in one direction as in the other direction and for an exact same distance of travel in said opposite direction.

5. The combination defined by claim 1 in which said rotatable actuating means includes a common shaft, said indexing means including said shaft having a first indexing mark extending across its center axis at each end face, and offset portions extending transversely at each end of said shaft opposite to each other and at a predetermined radial distance from the center axis of said shaft, said offset portions being continuously rotated in one direction by said motor through said shaft, each of said offset portions including a second indexing mark in line with the first indexing mark extending across an axis of said offset portion, each of said offset portions being coaxial with said shaft and including said second indexing mark extending at a 180 degree angle opposite each other, and said indexing means including adjustable clamp collar means at each end of said shaft for securing said offset portions on said shaft after aligning the first indexing mark at each end of said shaft with the second indexing mark at each of said offset portions so as to effect an adjustment of said offset portions in relation to said shaft and thereby aligning said system to a predetermined condition, means supporting each intermediate race of each bearing at a transverse location and at a radial distance from an axis of oscillation of the oscillating journaled mechanism means and at a distance in excess of the predetermined radial distance of said offset portion, and means for connecting the driving means with said journaled mechanism means for continuously rotating said shaft by said driving means so as to thereby continuously oscillate said intermediate race by said journaled mechanism means in opposite directions and over equal angular ranges.

6. The combination defined by claim 1 including means driving said actuating means in one direction of rotation, said driving means including a motor, a worm and gear drive operably driven by said motor, and a jack shaft driven by said worm and gear drive and rotating in one direction, said rotatable actuating means including a pair of first pivot wheels connected to said shaft for continuous rotation in one direction, each of said first pivot wheels having a face, said indexing means including an indexing line extending across the face of each first pivot wheel through a common axis of rotation of said first pivot wheel and shaft, said shaft including an indexing line extending across each of its ends through its common axis of rotation for alignment with the indexing line of said first pivot wheel, the lines of said shaft operable for matching the lines of each end of said shaft for setting the angle of rotation of each first pivot wheel at exactly 180 degrees out of phase with each other, an offset pin connected to each of said first pivot wheels centrally on the indexing line and at a predetermined distance from the common axis of rotation of said first pivot wheels and at an exact opposite phase to each other, a linkage pivotally connecting each of said pins and extending substantially in the plane of rotation, said oscillating journaled mechanism means including a pair of second pivot wheels each having a pivot pin pivotally connecting said linkage and wherein said pivot pins of the second pivot wheels are located at a distance from a center of oscillation of said journaled mechanism means which is greater than the predetermined distance of the offset pins of the first pivot wheels of said actuating means and at an angle to each other for producing an equal oscillation of said journaled mechanism means as said actuating means is continuously rotated in one direction.

7. The combination defined by claim 6 wherein each of said journaled mechanism means includes a gear interposed between each of the intermediate races and said second pivot wheels, said gear meshing with each of said second pivot wheels for oscillating each of said intermediate races within the bearings.

8. The combination defined by claim 6 wherein each of said journaled mechanism means includes a gear meshing with each of said second pivot wheels and oscillated thereby for producing the oscillating action within the intermediate races of each of said bearings and a main gimbal frame supporting the bearings for operation of said intermediate races through said gears and said pivot wheels.

9. The combination defined by claim 6 wherein each of said journaled mechanism means includes a gear meshing with each of said second pivot wheels and oscillated thereby for producing the oscillating action of the intermediate races within said bearings and wherein each of said gears are integral to each of said intermediate races.

10. The combination defined by claim 6 wherein each bearing includes outer and inner races and wherein each of said journaled mechanism means includes a gear meshing with each of said second pivot wheels and oscillated thereby for producing the oscillating action of the intermediate races within said outer and inner races and wherein each of said intermediate races has one of said gears integral therewith, and further comprising an inner gimbal shaft connecting the inner races of said bearings, a main frame gimbal connecting the outer races of said bearings, and linkage assembly means interposed between said oscillating journaled mechanism means and said rotatable actuating means, said actuating means including first pivotal connecting means for connecting said linkage assembly means at a predetermined offset distance from the center of rotation of said rotatable actuating means, and said oscillating journaled mechanism means including second pivotal connecting means connecting said linkage assembly means at an offset distance from the center of oscillation of said oscillating journaled mechanism means which is greater than the predetermined offset distance of said first connecting means for producing a continuous oscillating motion at exact and equal displacement over an angular range of less than 180 degrees and more than 90 degrees and at an equal period of oscillation as said actuating means is continuously rotated in one direction.

References Cited

UNITED STATES PATENTS

| | | | |
|---|---|---|---|
| 841,612 | 1/1907 | Anschutz-Kaempfte | 74—5 |
| 2,970,480 | 2/1961 | Zeigler et al. | 74—5 |
| 2,410,602 | 11/1946 | Davis. | |
| 2,577,942 | 12/1951 | Agins. | |
| 2,973,649 | 3/1961 | Zeigler et al. | |
| 3,082,629 | 3/1963 | Jones et al. | |
| 3,131,568 | 5/1964 | Garwood. | |
| 3,225,606 | 12/1965 | Stiles. | |

FRED C. MATTERN, JR., *Primary Examiner.*

F. D. SHOEMAKER, *Assistant Examiner.*